Patented May 17, 1927.

1,629,259

UNITED STATES PATENT OFFICE.

FRANK JOSEPH CRUPI, OF BROOKLYN, NEW YORK, ASSIGNOR TO HERMAN BEHR & CO., INC., OF BROOKLYN, NEW YORK, A CORPORATION OF NEW YORK.

WATERPROOF ABRASIVE FABRIC.

No Drawing. Original application filed February 19, 1924, Serial No. 693,903. Divided and this application filed August 25, 1926. Serial No. 131,538.

This invention relates to and has for its object the production of a waterproof sandpaper or abrasive fabric capable of withstanding disintegration when used on wet surfaces.

According to the present invention I provide a coating, the fundamental element of which is a cellulosic material (cellulose nitrate, cellulose acetate, or the like) as distinguished from oils, varnishes or resins. The cellulosic material is soluble in a variety of easily vaporizable solvents or mixtures of solvents and such a solution possesses the characteristics necessary for handling and application.

The principles of this invention may be applied in connection with a large variety of formulæ. The relative amounts of cellulose nitrate, for example, and of its solvent, will obviously vary according to the consistency desired for every particular operation. One formula suitable for use in the production of the sand-paper of this invention, especially appropriate with relation to admixture with other material to be hereinafter referred to, is as follows: 16 ounces of cellulose nitrate (11 to 13% nitrogen) dissolved in one gallon of a solvent consisting of 60% amyl acetate, 10% acetone, 15% benzol and 15% denatured alcohol.

The cellulosic material of the foregoing solution is the basis of the coating of the present invention and supplies the means by which the abrasive grains are retained on the base paper or backing material with sufficient tenacity to resist separation of the abrasive grains from the backing when the sand-paper is used in association with water. In connection with the cellulosic solution I prefer to use one or more supplemental solutions, examples of which may be stated as follows:

I. 50% of gum resins (25% copal—25% sandarac), 50% denatured alcohol.

II. 4 pints of rape seed oil, 5 pints of ethyl acetate.

When mixed in the proportion of two gallons of the cellulosic solution, one gallon of solution I, and one gallon of solution II, a composition will be formed which can be applied with satisfactory results to the base material of the abrasive fabric. The result of using a solution such as No. I is not only to act as a spreader or filler material with respect to the cellulosic material but to increase the hardness and adhesiveness of the coating while the result of using solution No. II is to act as an emollient, i. e. to produce or to increase a condition of flexibility. Neither the resins of solution I, nor the oil of solution II, however, are the active agents which retain the abrasive grains on the paper, that function being exercised by the cellulosic material of the cellulosic solution.

The cellulose nitrate may be of any per cent nitrogen composition and other solvents or combinations or proportions of solvents may be employed in place of the specific solvents and proportions recited in the formula for the cellulosic solution above given. A result which is satisfactory for many purposes may also be obtained by using a composition of celluloid dissolved in a convenient solvent or mixture of solvents, celluloid being cellulose nitrate treated with camphor, which is ordinarily termed a gum. Such a celluloid solution can be used either alone or in admixture with added camphor or camphor substitutes or gum resins may be added to increase or to accentuate hardness and adhesive qualities. Compounds of cellulose acetate may also be employed in place of cellulose nitrate with equally satisfactory results.

The process of manufacturing sand-paper in accordance with this invention consists of coating a fabric backing with the described composition depositing abrasive grains upon this coating while in a plastic condition and drying by evaporating the solvent. After the first coating which carries the abrasive grains has dried, the sand-paper is given a top coating of the same composition and the paper is then thoroughly dried, which completes its manufacture. The coating of this invention dries readily and with convenient speed and does not require the use of elaborate or special apparatus. The manufacture of sand-paper in accordance with the new process can be handled with the present equipment available at any sand-paper factory and does not require any excessive space for dry rooms, handling or other details of operation.

In most industries in which waterproof sand-paper is advantageously used, it is requisite that the rear surface of the fabric backing be also rendered waterproof. This water-proofing of the paper or fabric foundation material can be accomplished by the use of any suitable water-proofing material either before or after the other side of the sheet is coated with abrasive. It is preferable, however, to coat the back of the fabric with the same composition which is used in waterproofing the face of the fabric.

Sand-paper produced in accordance with this invention is stable and does not deteriorate with the passage of time as is likely to occur in sand-paper in which the adhesive character of the coating is made to depend upon oxidation products of oil or varnish compositions.

I include within the scope of this invention sand-paper whether made with a backing of paper or any other conventional backing material of the sand-paper art as well as articles made from the sand-paper of my invention. I further include within the scope of this invention sand-paper whether coated on one or both sides of the fabric base or whether used in one or more coats on that side which bears the abrasive material.

The present application is a divisional application of applicant's case, Serial No. 693,903, filed February 19, 1924.

I claim:

1. As a new article of manufacture a sand-paper product comprising a fabric base and abrasive material adhesively associated with said base by waterproof cellulosic coating material, said coating material containing a filler and also an emollient to maintain flexibility in the filler and the associated cellulosic material.

2. As a new article of manufacture a sand paper product comprising a fabric base, abrasive material adhesively associated with said base, and a waterproof coating of cellulosic material, resin and oil, in which the cellulosic material maintains the position of the abrasive grains on the base, the resin serving as a filler and the oil as an emollient to maintain flexibility.

In testimony whereof I have hereunto set my hand.

FRANK JOSEPH CRUPI.